United States Patent
Bell (10) Patent No.: US 10,619,394 B2
(45) Date of Patent: Apr. 14, 2020

(54) SPACER ASSEMBLY (71) Applicant: Illinois Tool Works Inc., Glenview, IL (US)

(72) Inventor: Kileean Bell, Crete, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/142,630

(22) Filed: Sep. 26, 2018

(65) Prior Publication Data
US 2019/0119969 A1    Apr. 25, 2019

Related U.S. Application Data (60) Provisional application No. 62/574,234, filed on Oct. 19, 2017.

(51) Int. Cl.
| | |
|---|---|
| *E05F 5/02* | (2006.01) |
| *B60J 5/10* | (2006.01) |
| *B62D 25/12* | (2006.01) |
| *F16B 43/00* | (2006.01) |
| *F16B 5/02* | (2006.01) |
| *F16B 21/02* | (2006.01) |

(52) U.S. Cl.
CPC .............. *E05F 5/022* (2013.01); *B60J 5/107* (2013.01); *B62D 25/12* (2013.01); *F16B 5/0233* (2013.01); *F16B 43/00* (2013.01); *E05F 5/025* (2013.01); *E05Y 2201/224* (2013.01); *E05Y 2600/61* (2013.01); *E05Y 2800/678* (2013.01); *E05Y 2900/531* (2013.01); *E05Y 2900/536* (2013.01); *E05Y 2900/548* (2013.01); *F16B 21/02* (2013.01)

(58) Field of Classification Search
CPC ..... Y10T 16/61; Y10T 16/625; Y10T 16/628; Y10T 16/6285; E05F 5/00; E05F 5/003; E05F 5/006; E05F 5/02; E05F 5/022; E05F 5/06; F16F 1/44; F16F 1/445; F16F 1/3732; F16F 1/3735; B65G 69/001; B60G 2204/4502

See application file for complete search history.

(56) References Cited

U.S. PATENT DOCUMENTS

| | | | | |
|---|---|---|---|---|
| 5,735,511 A | * | 4/1998 | Stocker ................... | E05F 5/022 248/569 |
| 6,088,878 A | * | 7/2000 | Antonucci .............. | E05F 5/022 16/86 A |
| 6,119,306 A | * | 9/2000 | Antonucci .............. | E05F 5/022 16/86 A |
| 7,114,217 B2 | * | 10/2006 | Matsuzawa ............. | E05F 5/022 16/2.2 |

(Continued)

FOREIGN PATENT DOCUMENTS

| | | | | |
|---|---|---|---|---|
| DE | 29716111 U1 | * | 11/1997 | .............. B60J 5/101 |
| DE | 102007051103 A1 | * | 3/2009 | ................ F16F 1/44 |

(Continued)

*Primary Examiner* — Chuck Y Mah
(74) *Attorney, Agent, or Firm* — Quarles & Brady LLP (57) ABSTRACT

A spacer assembly includes a housing that is configured to couple to a component. The housing includes a central bore. A bumper is coupled to the housing. The bumper includes a bumper support including a shaft that extends within the central bore, and a bumper head coupled to the bumper support.

21 Claims, 8 Drawing Sheets

(56) References Cited

U.S. PATENT DOCUMENTS

| | | | | |
|---|---|---|---|---|
| 7,356,879 | B2* | 4/2008 | Dembowsky | F16B 5/0233 |
| | | | | 16/82 |
| 8,056,965 | B2* | 11/2011 | Rosemann | E05F 5/022 |
| | | | | 16/86 A |
| 8,407,857 | B2* | 4/2013 | Sugiyama | F16F 1/371 |
| | | | | 16/86 R |
| 8,616,622 | B2* | 12/2013 | Davis | B60R 21/34 |
| | | | | 180/69.2 |
| 8,991,537 | B2* | 3/2015 | Snede | E05F 5/022 |
| | | | | 180/69.2 |
| 9,212,512 | B2* | 12/2015 | Nakasone | F16F 1/128 |
| 9,963,917 | B2* | 5/2018 | Reyes Luna | E05F 5/022 |
| 2002/0003993 | A1* | 1/2002 | Ichimaru | E05F 5/022 |
| | | | | 411/325 |
| 2004/0025290 | A1* | 2/2004 | Novarino | E05F 5/022 |
| | | | | 16/86 A |

FOREIGN PATENT DOCUMENTS

| | | | |
|---|---|---|---|
| FR | | 2886329 | 12/2006 |
| JP | | 2006062633 A * | 3/2006 |
| WO | WO 2015/094457 | | 6/2015 |

* cited by examiner

SPACER ASSEMBLY

RELATED APPLICATIONS

This application relates to and claims the benefit of U.S. Provisional Patent Application No. 62/574,234, entitled "Adjustable Spacers," filed Oct. 19, 2017, which is hereby incorporated by reference in its entirety.

FIELD OF EMBODIMENTS OF THE DISCLOSURE

Embodiments of the present disclosure generally relate to spacers, such as bumpers, that are configured to space apart two components, such as a door or hood and a fixed portion of a vehicle, such as a frame.

BACKGROUND

Adjustable spacer devices are used to withstand force and reduce vibrations of parts that may be opened, such as the hood of an engine compartment or a door of a trunk of a vehicle. The spacer devices support a moveable structural part (for example, the hood or trunk door) in relation to a stationary structural part (for example, a frame of a vehicle). Distances between the two parts may vary, such as due to manufacturing and assembly tolerances.

WO 2015/094457 discloses a self-adjusting spacer device. FR 2,886,329 discloses a self-adjusting spacer.

Known spacers have stops that are created through interference of features that are used to halt accidental movement. Accordingly, the known spacers may reduce a range of possible travel and extend to an increased height above a component.

SUMMARY OF EMBODIMENTS OF THE DISCLOSURE

A need exists for a spacer that is able to compensate for manufacturing and assembly tolerances between two structural parts. Further, a need exists for a spacer that has an increased range of travel and a compact structure.

With those needs in mind, certain embodiments of the present disclosure provide a spacer assembly that includes a housing that is configured to couple to a component. The housing includes a central bore. A bumper is coupled to the housing. The bumper includes a bumper support including a shaft that extends within the central bore, and a bumper head coupled to the bumper support.

In at least one embodiment, the bumper head is formed of a thermoplastic elastomer (TPE). In at least one embodiment, the housing has a first hardness, and the bumper head has a second hardness. The first hardness exceeds the second hardness.

The housing may include a collar circumferentially extending around the tube, and one or more securing protuberances outwardly extending from the tube.

In at least one embodiment, the housing includes housing thread segments that extend towards a central longitudinal axis within the central bore. The housing thread segments include a plurality of housing threads. The housing thread segments may be separated by smooth segments.

In at least one embodiment, the bumper support includes support thread segments that outwardly extend from the shaft. The support thread segments include a plurality of support threads. The support thread segments extend around a limited radial range of a circumference of the shaft.

In at least one embodiment, the bumper support includes bumper beam grooves that receive and retain beams of the bumper head.

In at least one embodiment, the bumper head includes a cap having a circumferential wall connected to a cover, and beams extending from the cap opposite from the cover. The beams are rotationally constrained within bumper beam grooves formed in the shaft of the of the bumper support. The beams include a threaded outer surface having a plurality of beam threads, which may be flexible and resilient. The plurality of beam threads may have a first pitch that exceeds a second pitch of a plurality of support threads outwardly extending from the shaft of the bumper support. The first pitch also may also exceed a third pitch of a plurality of housing threads that inwardly extend into the central bore from the tube of the housing. In at least one embodiment, the plurality of beam threads have a first height that is less than a second height of a plurality of housing threads that extend from the tube into the central bore.

The beams may include barrier walls that are configured to abut into end walls of support thread segments extending from the shaft of the bumper support. A cap of the bumper head may secure over and onto a head of the bumper support.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS
OF THE DISCLOSURE

Embodiments of the present disclosure provide a spacer assembly, which may be or otherwise provide a bumper, which is configured to be secured to a component, such as a planar piece of sheet metal. The spacer assembly may include a base or housing that threadably retains a bumper support (such as a screw-like member) that couples to a bumper head, such as may be formed of an overmolded soft thermoplastic elastomer (TPE). The housing is configured to attach to a structure, such as within a vehicle. Threads on the bumper support and the housing may be non-contiguous. That is, the threads may not extend around an entirety of an outer circumferential area. The bumper head may include one or more beams that are retained within longitudinal grooves formed on an outer surface of the bumper support.

An internal bore of the housing may include threads that extend inwardly towards a central longitudinal axis. The threads may not extend entirely around the bore. Instead, opposed threads may extend over a limited radial range within the bore. While the housing may secure to a component (such as a piece of sheet metal) through a quarter-turn fastener, other fastener mechanisms may be used.

Threads within the bore of the housing match threads of the bumper support. An open area within the bore of the housing allows the bumper support to move when the bumper head is impacted by a component, such as a hood.

The bumper head is configured to contact a structural component, such as a hood or door, and is pushed to an unlocked position. The threads set the bumper head to a pre-driven position, creating a designed interference. A hard stop on the bumper support halts motion of the bumper head after a quarter turn, for example.

Interference between the bumper head (for example, the beam) and the housing creates a dynamic friction force that dampens motion of the bumper support. As such, the bumper support is stopped from accidental motion, such as during shipping, and from moving too far due to an impact from a component.

The threads of the bumper head may be shorter than the threads on the beam of the bumper support, thereby creating friction and interference with the threads of the housing during shipping and loading to reduce the chance of accidental motion, such as the bumper head and bumper support being driven too far into the housing.

The bumper head is rotatable, and may include frictional members that are configured to ease turning motion during a pre-drive process. The threads are flexible and resilient. As the threads move past the housing threads, the housing threads are able to fold into an area between neighboring threads of the bumper support. The bumper support and the bumper head may be configured to bond and lock to one another.

Figure 1:
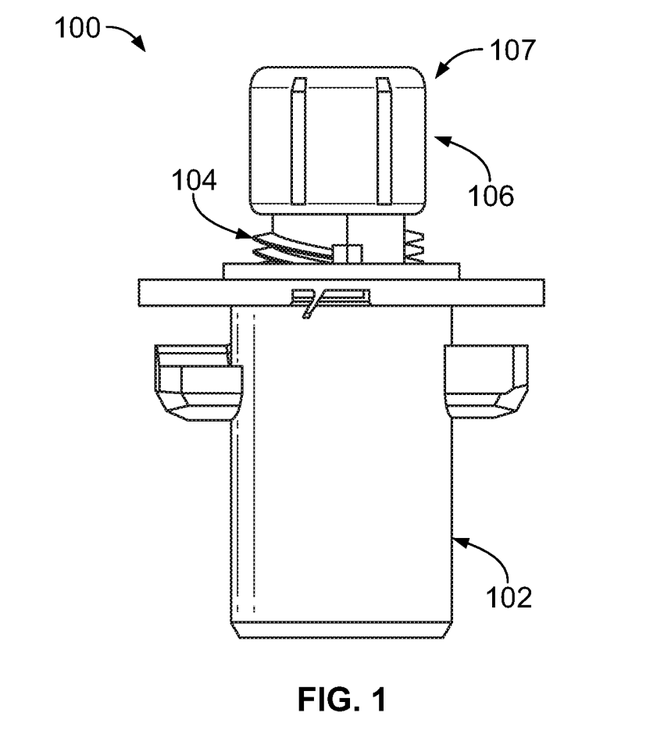
FIG. 1 illustrates a front view of a spacer assembly, according to an embodiment of the present disclosure.

FIG. 1 illustrates a front view of a spacer assembly 100, according to an embodiment of the present disclosure. The spacer assembly 100 includes a housing 102 (such as a base), a bumper support 104 (such as a screw-like member) coupled to the housing 102, and a bumper head 106 coupled to the bumper support 104. The bumper support 104 and the bumper head 106 provide a bumper 107. The bumper 107 is moveably coupled to the housing 102. The housing 102 is configured to attach to a component, such as a frame of a vehicle. The housing 102 retains the bumper support 104. The bumper head 106 may be formed of a soft elastomeric material, such as a soft thermoplastic elastomer (TPE). In at least one embodiment, the housing 102 is formed of a material, such as a metal or a plastic, which is harder than the bumper head 106. That is, the housing 102 has a first hardness and the bumper head 106 has a second hardness, wherein the first hardness exceeds the second hardness. Optionally, the bumper head 106, the bumper support 104, and the housing 102 may all be formed of a relatively soft material, such as TPE.

Figure 2:
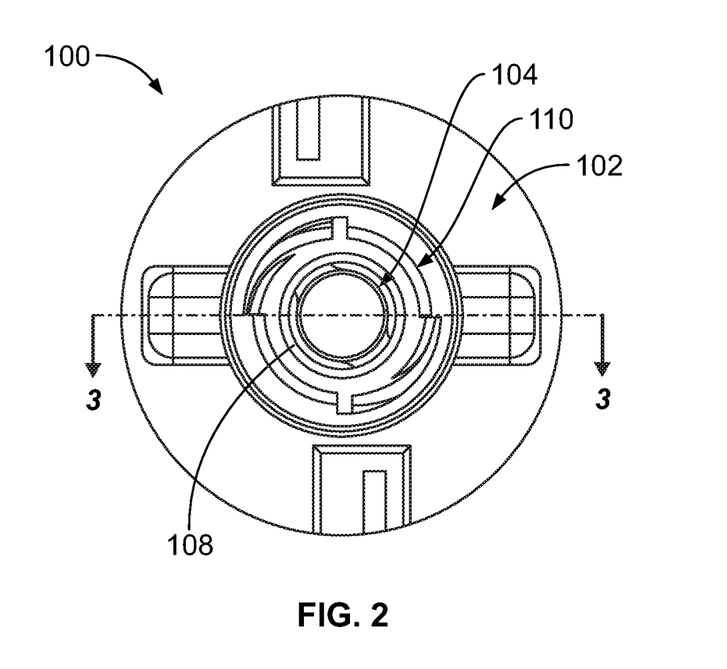
FIG. 2 illustrates a bottom view of the spacer assembly.
Figure 3:
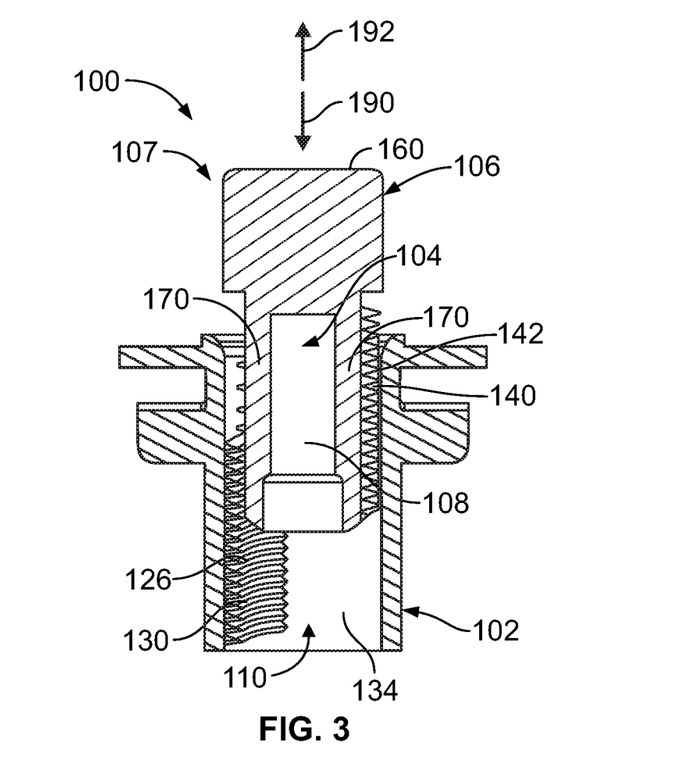
FIG. 3 illustrates a cross-sectional view of the bumper assembly through line 3-3 of FIG. 2.

FIG. 2 illustrates a bottom view of the spacer assembly 100. FIG. 3 illustrates a cross-sectional view of the spacer assembly 100 through line 3-3 of FIG. 2. Referring to FIGS. 2 and 3, the bumper support 104 includes a shaft 108 that extends within a central bore 110 of the housing 102.

Figure 4:
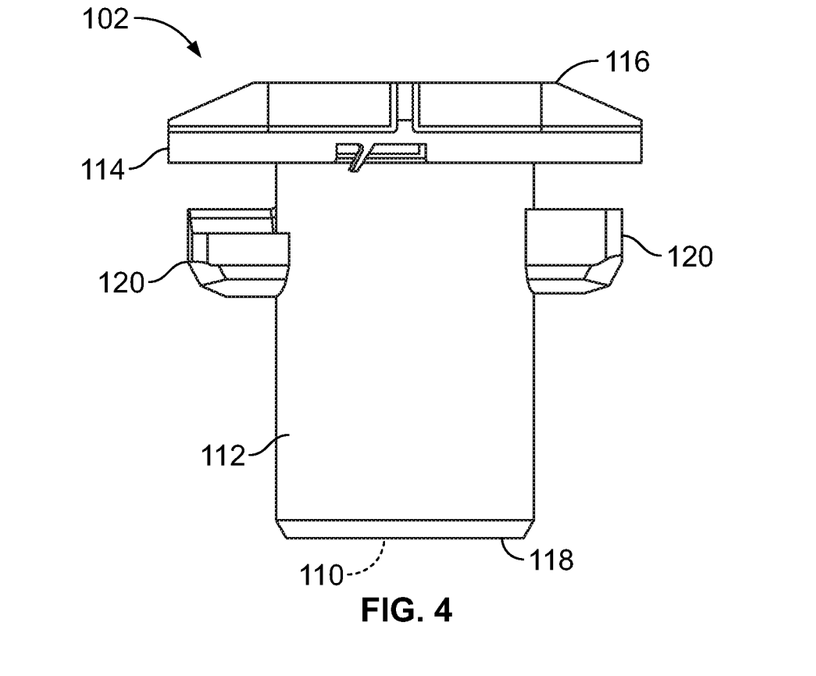
FIG. 4 illustrates a front view of a housing.

FIG. 4 illustrates a front view of the housing 102. FIG. 4 shows the housing 102 without the bumper support 104 and the bumper head 106 coupled thereto (in contrast to FIG. 1). The housing 102 includes a central tube 112 that defines the central bore 110. The central tube 112 may be open-ended, or closed. A collar 114 may circumferentially extend around the tube 112 proximate a first end 116 that is opposite from a second end 118. The central bore 110 may extend between and through the first end 116 and the second end 118. Optionally, the central bore 110 may extend through the first end 116, but not the second end 118. In at least one embodiment, securing protuberances 120 may outwardly extend from the tube 112. The securing protuberances 120 are spaced apart from the collar 114.

Figure 5:
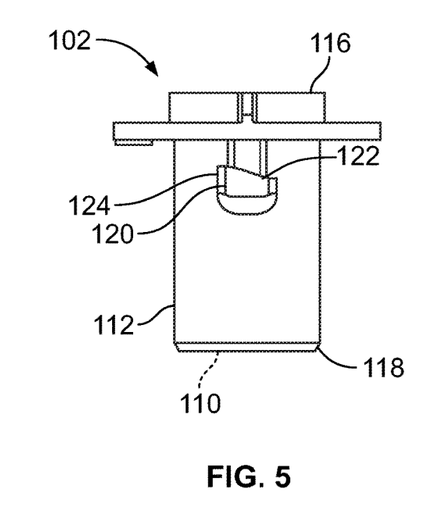
FIG. 5 illustrates a lateral view of the housing.

FIG. 5 illustrates a lateral view of the housing 102. Referring to FIGS. 4 and 5, the securing protuberances 120 may include a ramped lead-in end 122 that connects to a blunt trailing end 124. The securing protuberances 120 are configured to secure the housing 102 to a component, such as through a quarter turn. For example, the component may include a reciprocal opening that receives the tube 112 and the securing protuberances 120. After the housing 102 is inserted into the reciprocal opening, the housing 102 may be turned ninety degrees (that is, a quarter turn) so that the protuberances 120 are no longer aligned with the portions of the reciprocal opening, thereby securing the housing 102 to the component. Optionally, the housing 102 may not include quarter turn securing protuberances. In at least one embodiment, the housing 102 may be secured to the component through snap connections, latches, adhesives, and/or the like.

Figure 6:
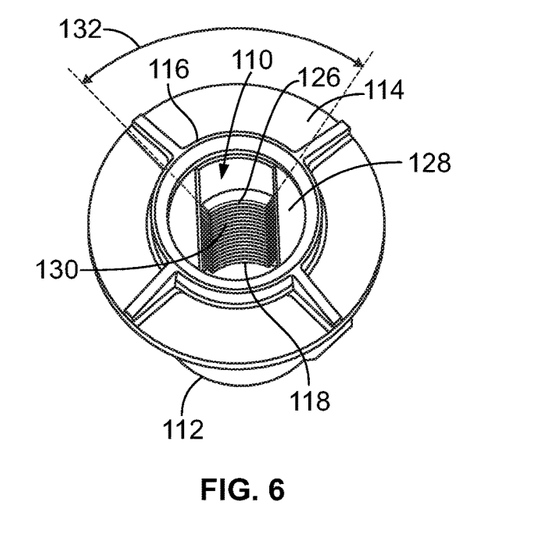
FIG. 6 illustrates a perspective top view of the housing.

FIG. 6 illustrates a perspective top view of the housing 102. Thread segments 126 (housing thread segments) extend inwardly from internal surfaces 128 of the central bore 110 towards a central longitudinal axis 129 (shown in FIG. 7). The thread segments 126 may not extend entirely around the central bore 110. Instead, each thread segment 126 may extend over a limited radial range within the central bore 110. The thread segments 126 include a plurality of housing threads 130 that extend from the second end 118 towards the first end 116. The thread segments 126 may not extend to the first end 116. Optionally, the thread segments 126 may be shorter or taller than shown (that is, extend a greater or lesser distance along the longitudinal axis 129). For example, the thread segments may not extend to the second end 118. Each thread segment 126 may extend radially around a portion of the central bore 110. For example, the thread segment 126 may extend around a forty-five degree arc 132 of the central bore 110. Optionally, the arc 132 may be greater or less than forty-five degrees.

Figure 7:
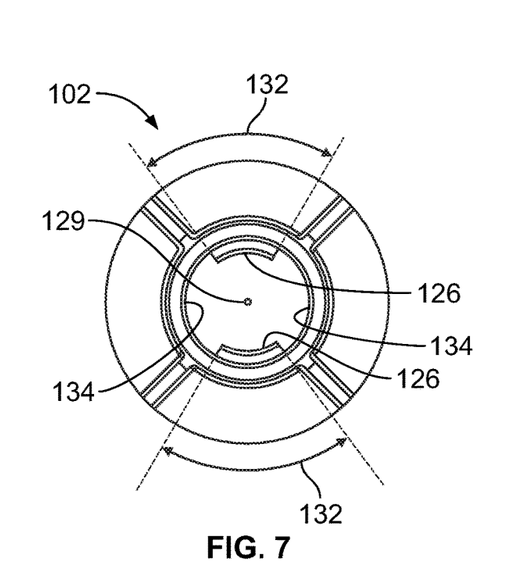
FIG. 7 illustrates a top view of the housing.

FIG. 7 illustrates a top view of the housing 102. As shown, the housing 102 may include two thread segments 126. In at least one other embodiment, the housing 102 may include one thread segment, or three or more thread segments. The thread segments 126 may be opposite from one another and may mirror one another. The thread segments 126 are radially separated by smooth segments 134. In other embodiments, any suitable number of thread segments having the same or different radial extents or arcs may be utilized.

Figure 8:
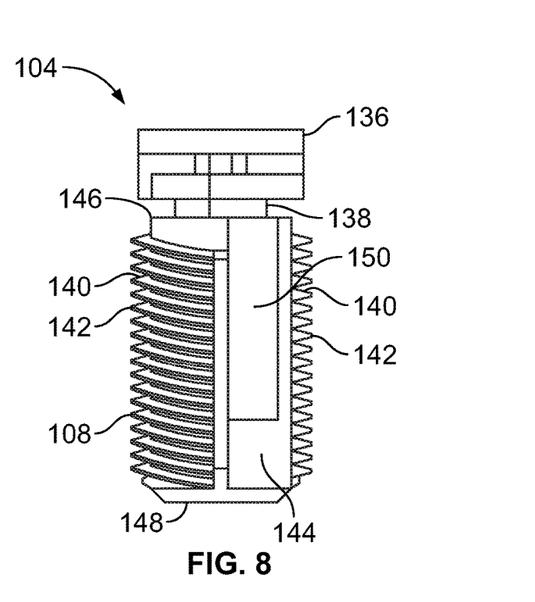
FIG. 8 illustrates a front view of a bumper support.

FIG. 8 illustrates a front view of the bumper support 104, according to an embodiment of the present disclosure. The bumper support 104 includes the shaft 108 connected to a head 136 through a reduced-diameter neck 138. Thread segments 140 (support thread segments) including a plurality of support threads 142 extend outwardly from the shaft 108. The thread segments 140 are radially spaced apart from one another by non-threaded segments 144. Each thread segment 140 may extend to and between a first end 146 of the shaft 108 and a second end 148 that is opposite from the first end 146. In other embodiment, the thread segments 140 may not extend fully between the first and second ends 146, 148. Bumper beam grooves 150 may extend into the shaft 108, such as within the non-threaded segments 144, from the first end 146 towards the second end 148. The bumper beam grooves 150 may not extend to and through the second end 148. The bumper beam grooves 150 are configured to receive and retain beams of the bumper head 106 (shown in FIG. 1), as described herein.

Figure 9:
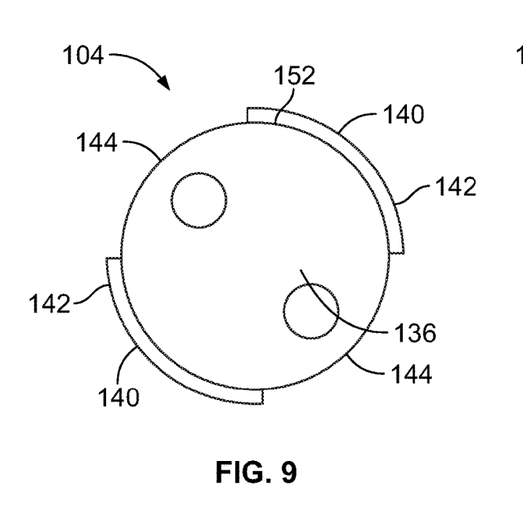
FIG. 9 illustrates a top view of the bumper support.
Figure 10:
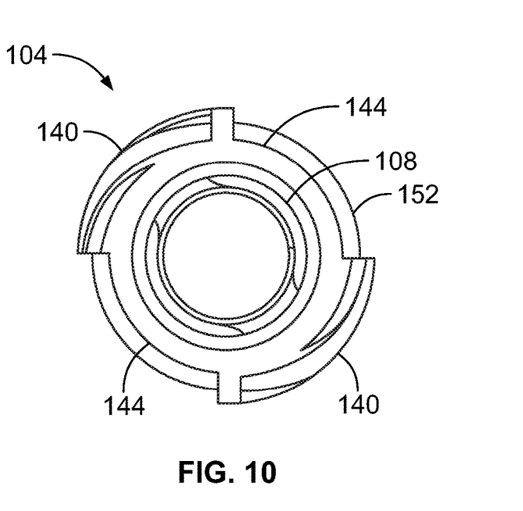
FIG. 10 illustrates a bottom view of the bumper support.

FIG. 9 illustrates a top view of the bumper support 104. The bumper support 104 may include two thread segments 140 that are opposite from one another and mirror one another. Optionally, the bumper support 104 may include one thread segment or three or more thread segments. As shown, the thread segments 140 may not extend entirely around a circumference of the shaft 108. Instead, each thread segment 140 may extend over a limited radial range of the circumference of the shaft 108. The thread segments 140 are radially spaced apart from one another by the non-threaded segments 144. In at least one embodiment, the support threads 142 of the thread segments 140 may (or may not) extend outwardly past an outer circumference 152 of the head 136.

Figure 11:
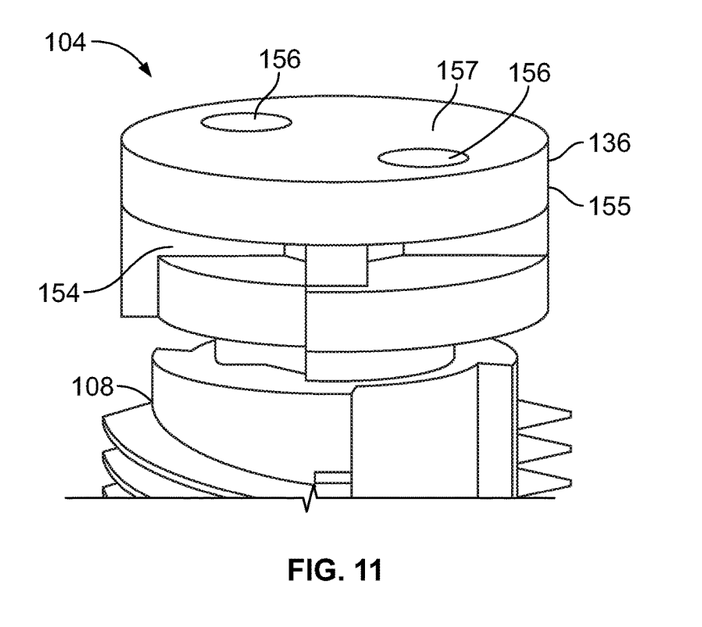
FIG. 11 illustrates a perspective top view of the bumper support.

FIG. 11 illustrates a perspective top view of the bumper support 104. The head 136 may include channels 154 extending into lateral portions 155 and openings 156 extending into a top surface 157 of the head 136. The channels 154 and the openings 156 may be configured to receive and retain reciprocal portions of the bumper head 106 (shown in FIG. 1) to provide connection therebetween of increased strength. Optionally, the head 136 may include more or less channels 154 and/or more or less openings 156 than shown. Further, the channels 154 and openings 156 may be sized and shaped differently than shown. In at least one embodiment, the head 136 may not include the channels 154 and/or the openings 156.

The bumper support 104 may be sized and shaped differently than shown. For example, the bumper support 104 may not include the channels 154 and/or the opening 156. In at least one embodiment, the bumper support 104 may include a central axial opening. In at least one embodiment, the bumper support 104 may include a plurality of ridges extending outwardly from the head 136. The ridges may be parallel to a longitudinal axis of the bumper support 104.

Figures 12, 13:
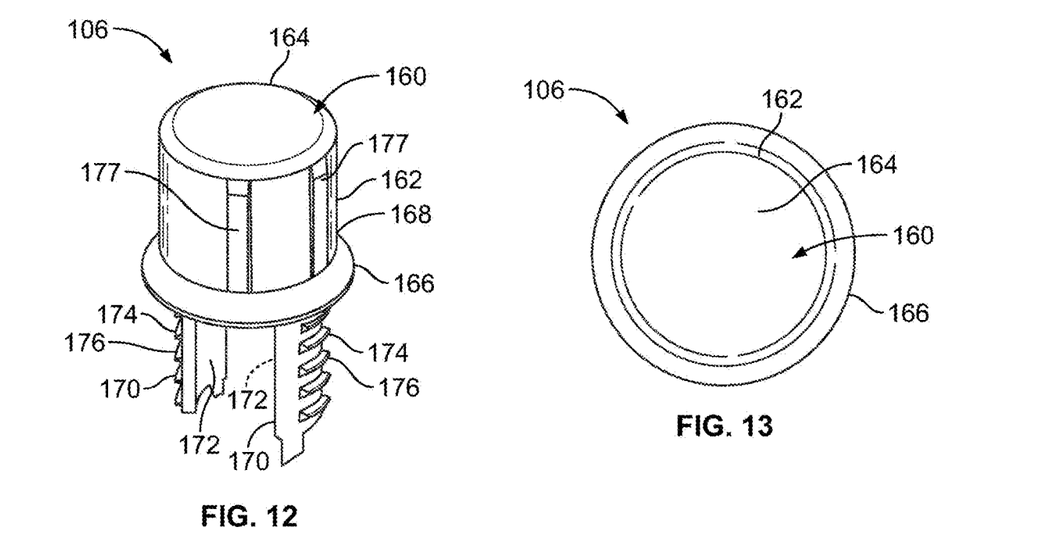
FIG. 12 illustrates a perspective top view of a bumper head.
FIG. 13 illustrates a top view of the bumper head.

FIG. 12 illustrates a top perspective view of the bumper head 106. FIG. 13 illustrates a top view of the bumper head. Referring to FIGS. 12 and 13, the bumper head 106 includes a cap 160 having a circumferential wall 162 coupled to a cover 164. A rim 166 may extend outwardly from a lower end 168 of the circumferential wall 162 opposite the cover 164. Beams 170 extend downwardly from the cap 160 in a direction that is away from the cover 164. In illustrative embodiments, the beams 170 include a smooth interior surface 172 and a threaded outer surface 174 that includes a plurality of beam threads 176.

The circumferential wall 162 may include one or more outwardly extending ridges 177, as shown in FIG. 12. The ridges 177 provide protuberances that may be easily grasped or otherwise engaged to ease rotation of the bumper head 106 and/or the bumper support 104 during a pre-drive process.

Figure 14:
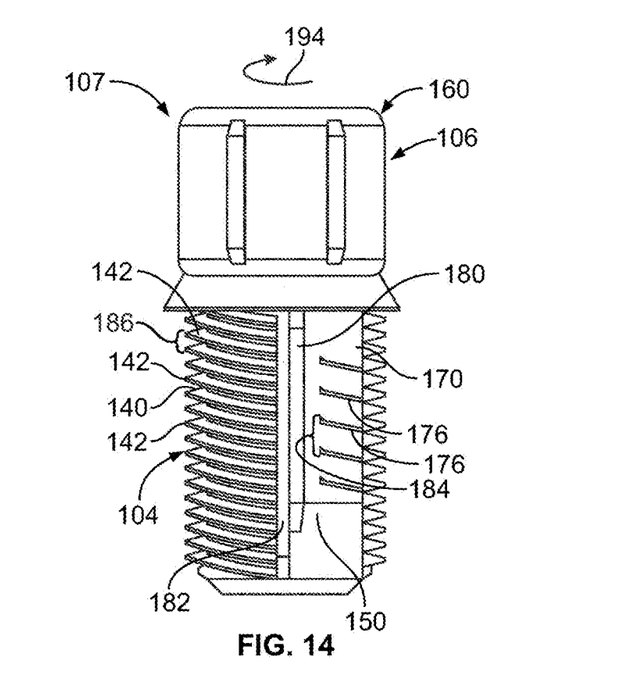
FIG. 14 illustrates a front view of a bumper head coupled to a bumper support.

FIG. 14 illustrates a front view of the bumper head 106 coupled to the bumper support 104. As noted, the bumper head 106 coupled to the bumper support 104 provides the bumper 107. Referring to FIGS. 8-14, the cap 160 of the bumper head 106 secures over and onto the head 136 of the bumper support 104. The beams 170 of the bumper head 106 extend into and are retained within the bumper beam grooves 150 of the bumper support 104. As shown, the beams 170 may include longitudinal barrier walls 180 that abut end walls 182 of the thread segments 140 to rotationally constrain the beams 170 within the bumper beam grooves 150. As shown, the beam threads 176 of the beams 170 may be at a first pitch 184 that exceeds a second pitch 186 of the support threads 142 of the thread segments 140 of the bumper support 104. Optionally, the first pitch 184 may be less than or equal to the second pitch 186.

Figure 15:
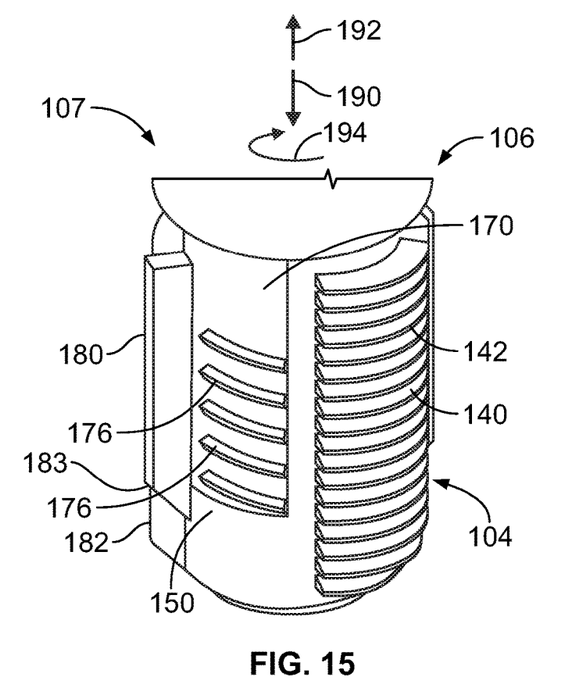
FIG. 15 illustrates a perspective view of a beam of the bumper head within a bumper beam groove of the bumper support.

Referring again to FIG. 3, the support threads 142 of the thread segments 140 of the bumper support 104 are configured to threadably engage the housing threads 130 of the thread segments 126 of the housing 102 to securely couple the bumper support 104 and the bumper head 106 to the housing 102. The smooth segments 134 of the central bore 110 provide smooth, open areas that allow the bumper support 104 (and therefore the bumper head 106) to move axially in the directions of arrows 190 and 192 (as shown in FIGS. 3 and 15) when the bumper head 106 is impacted by a component. For example, when a hood is slammed into the cap 160 of the bumper head 106, the bumper support 104 is urged axially downwardly into the central bore 110 in the direction of arrow 190.

FIG. 15 illustrates a perspective view of a beam 170 of the bumper head 106 within a bumper beam groove 150 of the bumper support 104. Referring to FIGS. 3, 14, and 15, as the cap 160 is impacted by a component, the bumper head 106 may shift downwardly on the bumper support 104, such that the beams 170 longitudinally shift downwardly in the direction of arrow 190.

Further, the interaction of the barrier walls 180 of the beams 170 and the end walls 182 of the thread segments 140 provides a hard stop. For example, as the barrier walls 180 abut the end walls 182, the ensuring hard stop prevents further rotation of the bumper head 106 relative to the bumper support 104 in the direction of arc 194.

As noted, the bumper head 106 including the beams 170 is formed of a soft material, such as a TPE. As such, the beam threads 176 are flexible and resilient.

Figure 16:
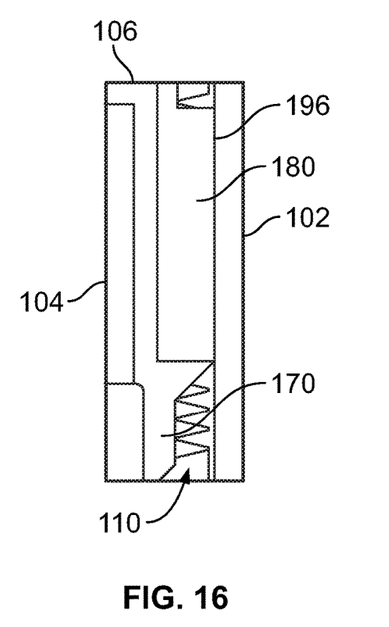
FIG. 16 illustrates a cross-sectional view of a portion of the bumper head coupled to the bumper support and the housing.

FIG. 16 illustrates a cross-sectional view of a portion of the bumper head 106 coupled to the bumper support 104 and the housing 102. Referring to FIGS. 15 and 16, interference between the barrier walls 180 and an internal surface 196 of the central tube 112 of the housing 102 that defines the central bore 110 generates friction therebetween, which slows or otherwise dampens a descent of the bumper head 106 on the bumper support 104. The frictional interference between the barrier walls 180 and the internal surface 196 of the central tube 112 may prevent the bumper support 104 from moving accidentally during shipping and moving past a desired limit when the bumper head 106 is impacted by a component (such as a hood of a vehicle).

As shown, the barrier walls 180 may be planar fins that extend outwardly from the beams 170. Lower ends 183 of the barrier walls may be ramped or wedge-shaped, in order to provide a desired frictional interference. For example, the lower ends 183 may be chamfered to provide lead-in features that allow for easier insertion into the housing 102, but increase interference when the bumper head 106 is impacted by a component, such as a hood. In at least one embodiment, the barrier walls 180 may be planar and/or angled.

Figure 17:
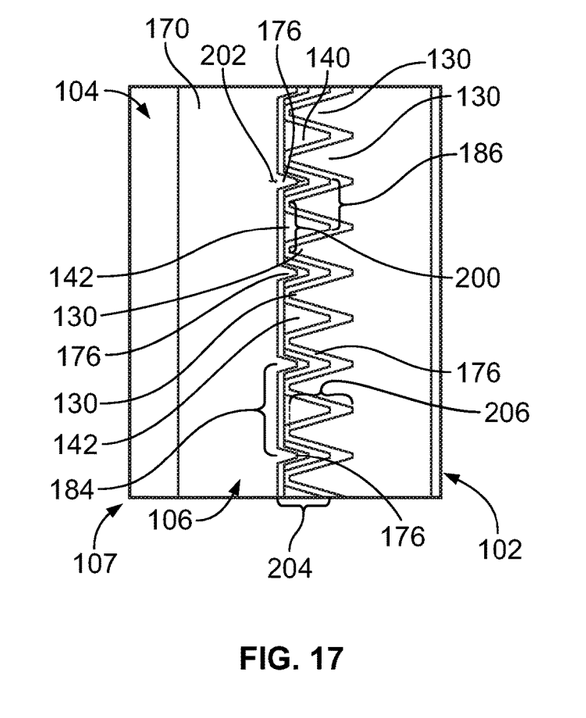
FIG. 17 illustrates a cross-sectional view of threads of a beam threadably engaging threads of a housing, according to an embodiment of the present disclosure.

FIG. 17 illustrates a cross-sectional view of the beam threads 176 of one beam 170 threadably engaging housing threads 130 of the housing 102. As shown, the first pitch 184 (that is, a spacing between neighboring crests of beam threads 176) of the beam threads 176 of the beam 170 may (or may not) be greater than the second pitch 186 (that is, a spacing between neighboring crests of support threads 176) of the thread segments 140 and the third pitch 200 (that is, a spacing between neighboring crests of housing threads 130) of the housing 102. The second pitch 186 may (or may not) be the same as the third pitch 200. Further, heights 202 of each thread 176 may (or may not) be shorter than heights 204 of the support threads 142 of the thread segments 140, as well as heights 206 of the housing threads 130. The soft material (such as TPE) of the beam threads reduces interference between the beam threads 176 and the housing threads 130 (in comparison to the interference between the larger support threads 142 and the housing threads 130). The frictional interference between the beam threads 176 and the housing threads 130 provides a reduced amount of frictional interference during shipping and loading by a component, which prevents, minimizes, or otherwise reduces a possibility of the bumper 107 (including the bumper support 104 and the bumper head 106) from being undesirably pushed too far into the housing 102. Further, the threadable engagement between the beam threads 176 and the housing threads 130 aligns the bumper support 104 and the bumper head 106 relative to the housing 102 for easier pre-drive locking.

The flexible and resilient beam threads 176 of the beams 170 are able to resiliently flex and move over the housing threads 130 of the housing 102. For example, the beam threads 176 may fold into spaces therebetween as they are longitudinally pushed onto and past the housing threads 130.

Figure 18:
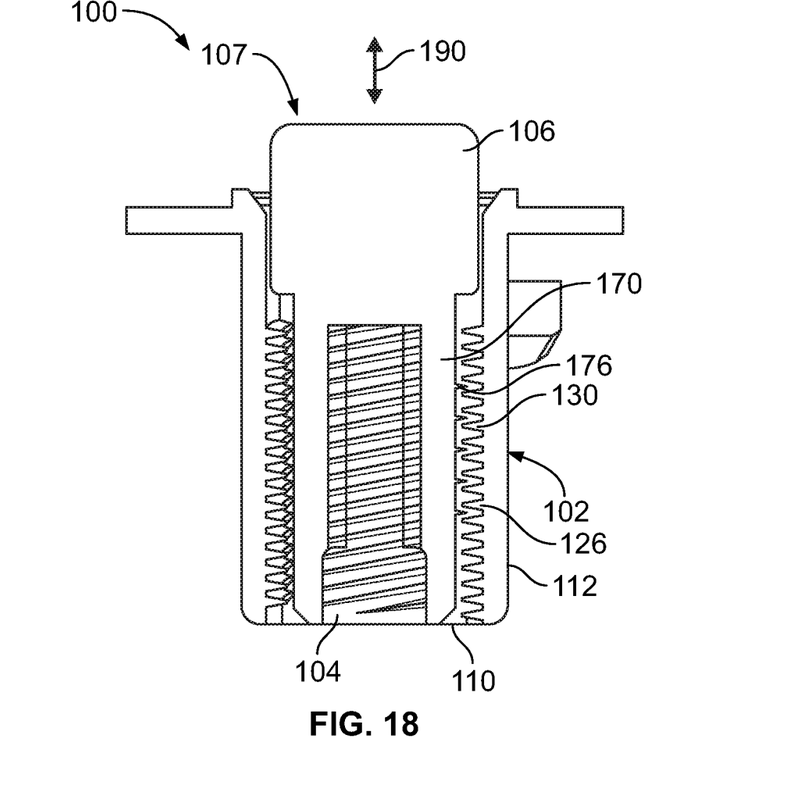
FIG. 18 illustrates an axial cross-sectional view of the spacer assembly.

FIG. 18 illustrates an axial cross-sectional view (along line 3-3 of FIG. 2) of the spacer assembly 100. The central bore 110 allows the bumper support 104 and the bumper head 106 (which is coupled to the bumper support 104) to travel a full length of the thread segments 126 of the housing 102 independent of threadable engagement between the beam threads 176 and the housing threads 130. For example, as the bumper head 106 is driven longitudinally in the direction of arrow 190, the resilient beam threads 176 of the beams 170 deflect and fold as they move onto and past the housing threads 130. The spacing (that is, the first pitch 184) between the neighboring relatively small beam threads 176 provides clearance areas for the beam threads 176 to fold. Further, the coupling of the bumper support 104 and the bumper head 106 within the single central bore 110 allows for a shorter bumper head 106 height above a panel, and smaller diameter of the bumper head 106, thereby allowing for compact designs.

Figure 19:
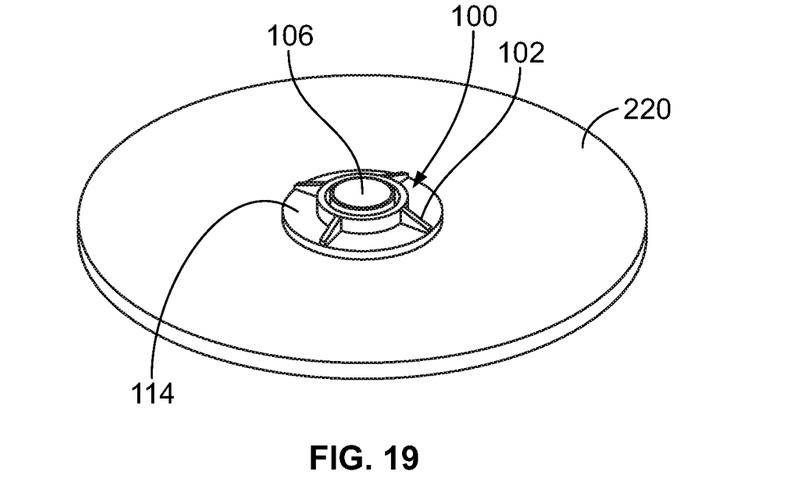
FIG. 19 illustrates a perspective top view of a spacer assembly secured to a component.
Figure 20:
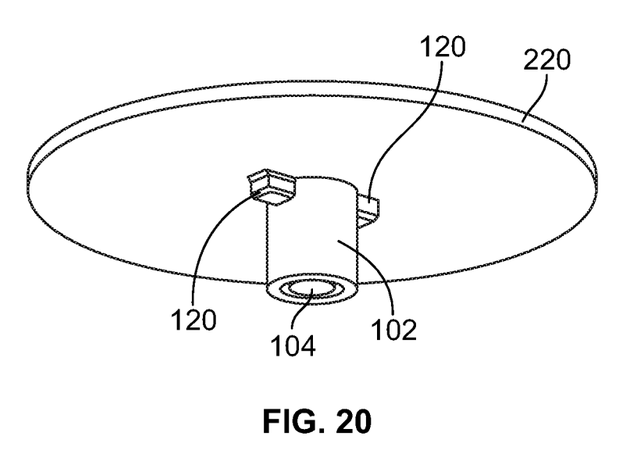
FIG. 20 illustrates a perspective bottom view of the spacer assembly secured to the component.

FIG. 19 illustrates a perspective top view of the spacer assembly 100 secured to a component 220. FIG. 20 illustrates a perspective bottom view of the spacer assembly 100 secured to the component 220. Referring to FIGS. 19 and 20, the component 220 may be a panel or surface, such as that of a frame of a vehicle. The housing 102 secures the spacer assembly 100 into an opening of the component 220, such as through a quarter turn.

Figure 21:
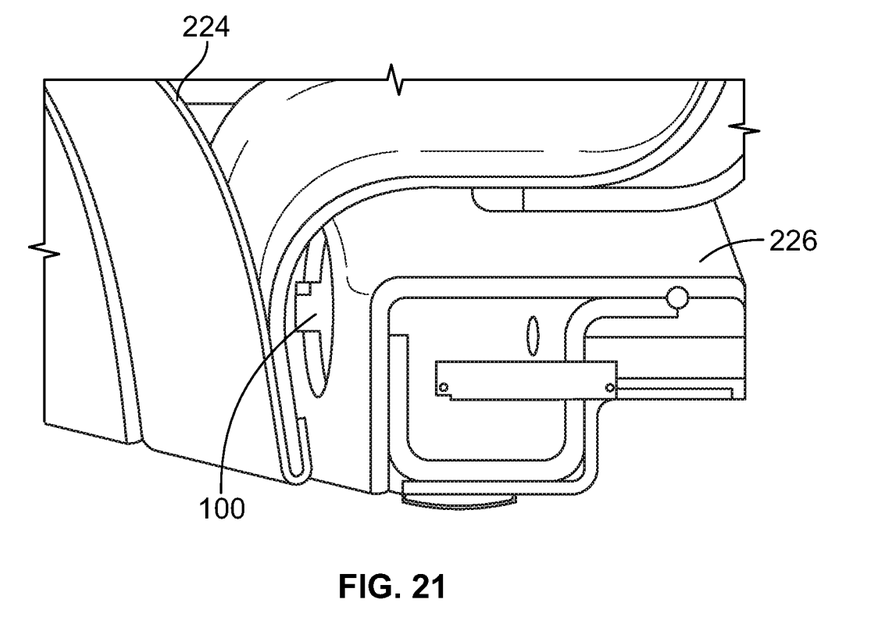
FIG. 21 illustrates a perspective view of a first component moveably coupled to a second component.

FIG. 21 illustrates a perspective view of a first component 224 moveably coupled to a second component 226. The first component 224 may be a door or hood of a vehicle. The second component 226 may be a frame of the vehicle. The spacer assembly 100 is secured to the second component 226 and is configured to provide a bumper that absorbs at least a portion of an impact of the first component 224 closing on the second component 226.

Referring to FIGS. 1-21, in operation, the spacer assembly 100 is initially set up. For example, the spacer assembly 100 may be placed in a desired location on or in a structure, such as the second component 226, and the spacer assembly 100 may then be substantially or fully outwardly extended. The moveable structure (such as the first component 224) is then closed, thereby causing the bumper support 104 and the bumper head 106 to move inwardly or otherwise towards the central bore 110 of the housing 102. The bumper support 104 is positioned so that the support threads 142 of the thread segments are offset in relation to the housing threads 130 of the thread segments 126 of the housing 102. That is, in this position, the support threads 142 are within the smooth segments 134 of the housing 102, but do not threadably engage the housing threads 130 of the housing 102. As such, the bumper support 104 and the bumper head 106 may be easily pushed into the housing 102 (with the resilient beam threads 176 of the beams 170 sliding and deflecting over the housing threads 130, if necessary). During such motion, the beam threads 176 of the beams 170 of the bumper head 106 fold, slide, and deflect back out as they engage the housing threads 130 of the housing 102, thereby providing a ratchet effect.

After the first component 224 is closed in relation to the second component 226, the spacer assembly 100 remains stationary because of the interference described in relation to FIG. 16, for example. As the first component 224 is subsequently opened in relation to the second component 226, the bumper support 104 and the bumper head 106 are rotated a quarter turn, with such motion being limited by the hard stop described with respect to FIG. 15. The rotational quarter turn range of motion between the bumper head 106 and the bumper support 104 turn provides an energy-absorbing resilience or bumper action when the first component 224 impacts the bumper head 106.

In at least one embodiment, the rotation of the bumper support 104 and the bumper head 106 causes the threads 130 and 142 to move up in relation to the bumper head 106 along the longitudinal axis 129 opposite from the direction of arrow 190, thereby creating an interference between the first component 224 and the bumper head 106 when the first component 224 is closed.

The soft TPE of the beam threads 176 of the beams 170 allows the threads to flex and/or compress thereby allowing the beam threads 176 to move longitudinally move past the housing threads 130 of the housing 102, but also prevent unintended dislodgement of the bumper support from the housing, such as via the aforementioned ratchet effect.

As described herein, embodiments of the present disclosure provide the spacer assembly 100 that is configured to compensate for manufacturing and assembly tolerances between two structural parts. The spacer assembly 100 provides an increased range of travel in a compact package.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A spacer assembly comprising:
   a housing that is configured to couple to a component, the housing comprising a central bore; and
   a bumper coupled to the housing, wherein the bumper comprises:
      a bumper support including a shaft that extends within the central bore; and
      a bumper head coupled to the bumper support,
      wherein the bumper support further comprises bumper beam grooves that receive and retain beams that extend downwardly from a cap of the bumper head.

2. The spacer assembly of claim 1, wherein the bumper head is formed of a thermoplastic elastomer (TPE).

3. The spacer assembly of claim 1, wherein the housing has a first hardness, and the bumper head has a second hardness, and wherein the first hardness exceeds the second hardness.

4. The spacer assembly of claim 1, wherein the housing further comprises:
   a collar circumferentially extending around a tube; and
   one or more securing protuberances outwardly extending from the tube.

5. The spacer assembly of claim 1, wherein the housing further comprises housing thread segments that extend towards a central longitudinal axis within the central bore, wherein the housing thread segments comprises a plurality of housing threads.

6. The spacer assembly of claim 5, wherein the housing thread segments are separated by smooth segments.

7. The spacer assembly of claim 1, wherein the bumper support further comprises support thread segments that outwardly extend from the shaft, wherein the support thread segments comprises a plurality of support threads, and wherein the support thread segments extend around a limited radial range of a circumference of the shaft.

8. The spacer assembly of claim 1, wherein the cap has a circumferential wall connected to a cover, and the beams extend from the cap opposite from the cover, and wherein the beams are rotationally constrained within the bumper beam grooves formed in the shaft of the bumper support.

9. The spacer assembly of claim 8, wherein the beams comprise a threaded outer surface having a plurality of beam threads.

10. The spacer assembly of claim 9, wherein the plurality of beam threads have a first pitch that exceeds a second pitch of a plurality of support threads outwardly extending from the shaft of the bumper support.

11. The spacer assembly of claim 10, wherein the first pitch also exceeds a third pitch of a plurality of housing threads that inwardly extend into the central bore from a tube of the housing.

12. The spacer assembly of claim 9, wherein the plurality of beam threads are flexible and resilient.

13. The spacer assembly of claim 9, wherein the plurality of beam threads have a first height that is less than a second height of a plurality of housing threads that extend from a tube into the central bore.

14. The spacer assembly of claim 8, wherein the beams comprises barrier walls that are configured to abut into end walls of support thread segments extending from the shaft of the bumper support.

15. The spacer assembly of claim 1, wherein a cap of the bumper head secures over and onto a head of the bumper support.

16. The spacer assembly of claim 1, wherein the bumper head is coupled to the bumper support by overmolding.

17. A spacer assembly comprising:
   a housing that is configured to couple to a component, the housing comprising a central bore, and housing thread segments that extend towards a central longitudinal axis within the central bore, the housing thread segments including a plurality of housing threads, the housing thread segments separated by smooth segments; and
   a bumper coupled to the housing, wherein the bumper comprises:
      a bumper support including a shaft that extends within the central bore, bumper beam grooves within the shaft, and support thread segments that outwardly extend from the shaft, the support thread segments including a plurality of support threads, and the support thread segments extending around a limited radial range of a circumference of the shaft; and
      a bumper head formed of a thermoplastic elastomer (TPE), the bumper head coupled to the bumper support, the bumper head including a cap having a circumferential wall connected to a cover, and beams extending from the cap opposite from the cover, the beams including a threaded outer surface having a plurality of beam threads, wherein the plurality of beam threads are flexible and resilient, and wherein the beams are rotationally constrained within the bumper beam grooves formed in the shaft of the of the bumper support.

18. The spacer assembly of claim 17, wherein the plurality of beam threads have a first pitch that exceeds a second pitch of the plurality of support threads, wherein the first pitch also exceeds a third pitch of the plurality of housing threads.

19. The spacer assembly of claim 17, wherein the plurality of beam threads have a first height that is less than a second height of the plurality of housing threads.

20. The spacer assembly of claim 17, wherein the beams comprises barrier walls that are configured to abut into end walls of the support thread segments.

21. The spacer assembly of claim 16, wherein at least the beams of the bumper head are overmolded to the bumper support within the bumper beam grooves.

* * * * *